United States Patent [19]

Mears

[11] Patent Number: 4,825,690
[45] Date of Patent: May 2, 1989

[54] METHOD OF CONTROLLING A DYNAMOMETER

[75] Inventor: William G. Mears, Kennett Square, Pa.

[73] Assignee: Mobil Oil Corporation, New York, N.Y.

[21] Appl. No.: 147,969

[22] Filed: Jan. 25, 1988

[51] Int. Cl.$^4$ .......................... G01L 3/22; G01L 5/13
[52] U.S. Cl. .................................... 73/117; 73/862.18
[58] Field of Search ............... 73/117, 862.18, 862.16, 73/862.13

[56] References Cited

U.S. PATENT DOCUMENTS 4,161,116 7/1979 Fegraus et al. .
4,327,578 5/1982 D'Angelo .

OTHER PUBLICATIONS

"Feed-Forward Dynamometer Controller for High Speed Inertia Simulation", Severino D'Angelo and R. D. Gafford; SAE Technical Paper Series; Passenger Car Meeting, Dearborn, Jun. 8–12, 1981.

Primary Examiner—Charles A. Ruehl
Attorney, Agent, or Firm—Alexander J. McKillop; Charles J. Speciale; Malcolm D. Keen

[57] ABSTRACT

A method for controlling a dynamometer used to simulate the on-road operation of a vehicle during testing on a dynamometer so as to achieve a more accurate matching of the on-road speed profile of the vehicle by the dynamometer. The dynamometer includes means for drivingly connecting the dynamometer to the powertrain of the vehicle, such as rollers on which the drive wheels of the vehicle rest and which are rotated by the vehicle drive wheels, or a direct drive to the output shaft of the vehicle engine and transmission. A power absorption and motoring unit is connected to the rollers or direct drive to simulate road operating forces. A force transducer is provided for measuring the force of the power absorption and motoring unit and a speed transducer is provided for measuring the speed of the power absorption and motoring unit. The force and speed of the power absorption and motoring unit are determined at short, precise time intervals to determine changes in the force produced by changes in the power of the vehicle. The feed-forward force necessary to bring the force of power absorption and motoring unit to the force required to control vehicle acceleration and speed to road equivalency is determined, and the power absorption and motoring unit force is adjusted to the determined value. This feed-forward force includes a factor which compensates for speed matching errors which result from large differences between the effective mass of the vehicle and the dynamometer.

8 Claims, 2 Drawing Sheets

—— TRUCK POWER AND ROAD SPEED
---- DYNO POWER AND SPEED WITH SPEED CORRECTION $F_{C2}$
······ DYNO POWER AND SPEED WITHOUT SPEED CORRECTION $F_{C2}$

METHOD OF CONTROLLING A DYNAMOMETER

FIELD OF THE INVENTION

The present invention relates to a method of controlling a dynamometer used for vehicle testing, and, more particularly, to a method of controlling the dynamometer so that it more closely simulates road operation of the vehicle being tested.

BACKGROUND OF THE INVENTION

Vehicle testing often requires simulation of the loading effects encountered during road operation. This is accomplished with a dynamometer connected to the vehicle power train; usually a chassis roll dynamometer turned by the vehicle wheels. The dynamometer is controlled to provide appropriate energy absorption or input so that the speed versus time profile of the vehicle powertrain is the same as it would be in road operation for any accelerator pedal movement versus time profile; i.e. the vehicle drives the same on the roll of the dynamometer as on the road.

It is desirable for the dynamometer to be able to accommodate the speed and acceleration capabilities of a wide range of vehicles, ranging from small passenger cars to large trucks, and provide accurate speed profile simulation without mechanical changes in the dynamometer machinery, such as connecting mass-simulating flywheels. A DC dynamometer with motoring and absorbing power in the same range as the most powerful vehicles to be tested can provide the required simulation if controlled correctly. However, dynamometer controls often do not provide accurate speed profile simulation in response to changes of vehicle power, especially when the mass of the vehicle being simulated is a large multiple o fraction of the equivalent mass of the dynamometer machinery.

A simulation error usually occurs when the vehicle power changes. This error results from the inevitable time delay required to measure the change in acceleration rate produced by the vehicle power change, during which the dynamometer machinery speed changes differently than the vehicle's speed would change on the road. As the difference between the simulated vehicle mass and the dynamometer machinery rotational mass increases, this error also increases. The speed profile must be restored to road-equivalency quickly for accurate simulation.

As described in U.S. Pat. No. 4,327,578 to S. D'Angelo, issued May 4, 1982, entitled DYNAMOMETER, dynamometer control methods have been developed which provide most of the required simulation. However, these methods do not address the speed error developed during the first control cycle after a vehicle power change. The reason why these control methods do not address this problem may be that heretofore dynamometers have been limited to relatively small ratios of vehicle to dynamometer mass, for example a ratio of about 3 to 1, where the errors are minor for a fast control. However, for much larger ratios of vehicle to dynamometer mass, for example a ratio of about 30 to 1, the errors can become significant. Therefore, it would be desirable to have a dynamometer control method which includes correction for the speed error so as to provide a more accurate control of the dynamometer.

SUMMARY OF THE INVENTION

A method of controlling a dynamometer having means for driving engagement with the drivetrain of a vehicle to be tested, a power absorption and motoring unit coupled with the driving engagement means for simulating road load and inertia forces, a torque transducer coupled to the power absorption and motoring unit for providing a force load signal and a speed transducer for providing a speed signal includes the steps of determining the torque and speed over short time intervals. The speed at which the driving engagement means should be moving is determined and compared with its actual speed. The torque of the power absorption and motoring unit is adjusted until the determined speed and actual speed agree. The adjustment in the torque includes not only changes in the torque necessary to keep the acceleration rate road-equivalent but also changes necessary to correct for speed errors.

BRIEF DESCRIPTION OF THE DRAWINGS

FIG. 2a is a graph of the changes in speed of the vehicle and dynamometer during the same operation of the vehicle as shown in FIG. 2a.

DETAILED DESCRIPTION OF PREFERRED EMBODIMENTS

Figure 1:
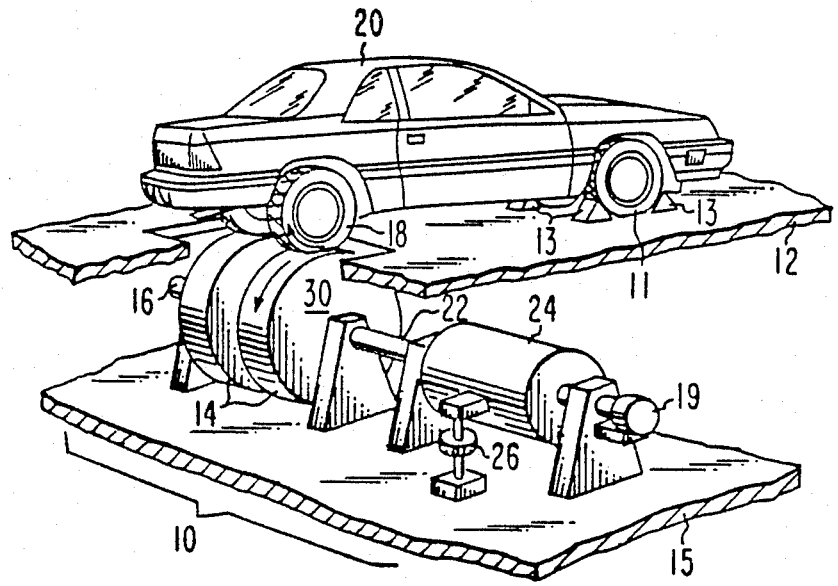
FIG. 1 is a perspective view of a vehicle on a chassis roll dynamometer.

Referring to FIG. 1, there is shown a typical chassis roll dynamometer 10 mounted beneath a vehicle support 12. The dynamometer 10 includes a pair of spaced rolls 14 mounted for rotation on a shaft 16 which is supported on a base 15. The rolls 14 are spaced apart a distance corresponding to the distance between the drive wheels 18 of a vehicle 20. The rolls 14 are connected by a shaft 22 to a power absorption and motoring unit 24. Between the power absorption and motoring unit 24 and the base 15 is a torque transducer 26 for providing an electrical signal corresponding to the force of the dynamometer. The dynamometer 10 is also provided with a speed transducer 19 which provides an electrical signal corresponding to the actual speed of the dynamometer. The vehicle 20 is on the vehicle support 12 with its drive wheels 18 extending through an opening 30 in the vehicle support 12 and seated on the rolls 14. The vehicle 20 is prevented from moving by chocks 13 acting on the non-drive wheels 11 of the vehicle. Thus, rotation of the vehicle drive wheels 18 rotates the rolls 14 and operates the dynamometer In the operation of the dynamometer 10 in the testing of a vehicle 20, the vehicle is generally operated as it would be on the road. Thus, the output of the powertrain of the vehicle 20 is varied, which varies the force applied by the wheels 18 of the vehicle. It is desirable that the speed of the wheels 18 on the dynamometer 10 have the same profile as it would have on the road for the same vehicle powertrain output. However, because the inherent internal friction and rotational inertia of the dynamometer 1 does not match that of the vehicle 20, the dynamometer 10 does not produce a road-equivalent speed profile of the vehicle 20. Heretofore, this problem has been overcome by measuring with the speed transducer 19 and torque transducer 26 of the dynamometer 10, the dynamometer speed $V_m$ and the dynamometer load $F_m$ over a short, precise time interval $\Delta t$ to obtain the average dynamometer load $F_{ma}$ and speed $V_{ma}$ using readings preceding and following each time interval. From these measurements, the road-equivalent speed change, $\Delta V_r$, over $\Delta t$ can be determined from the following formula, and the road-equivalent speed, $V_r$, can be obtained by adding successive $\Delta V_r$ values.

$$\Delta V_r = \frac{\Delta t(F_{ma} - (A + B V_{ma} + C V_{ma}^2 + (\sin\theta + D)W)) + M_o \Delta V_m}{M}$$

where:
- $F_{ma}$ = the average $F_m$ using the readings preceding and following each time interval,
- $V_{ma}$ = the average $V_m$,
- A = vehicle constant rolling resistance parameter with dynamometer constant friction outside the control loop subtracted,
- B = a constant which is the vehicle speed proportional rolling resistance parameter with dynamometer speed proportional friction outside the control loop subtracted,
- C = a constant which is the vehicle wind resistance parameter with dynamometer speed squared friction outside the control loop subtracted,
- W = gross weight of vehicle,
- $\sin\theta$ = sine of hill angle above or below horizontal,
- D = constant parameter for braking and miscellaneous forces,
- $M_o$ = effective mass of dynamometer machinery outside control loop equivalent to vehicle mass, and
- M = effective mass of vehicle.

Since all of the factors in the above formula are constant or known for a particular dynamometer and vehicle except for the speed and load factors, which are measured, the road-equivalent speed change $\Delta V_r$ can be easily determined for each time interval. The amount that the dynamometer load must be changed, i.e. the feed-forward value $F_{C1}$, so that the dynamometer speed change $\Delta V_m$ will match the determined road-equivalent speed change $\Delta V_r$ can then be determined from the following equation: $F_{C1} = A + BV_m + CV_m^2 + W(\sin\theta + D) + M(\Delta V_r/\Delta t)$ Although changing the dynamometer load by $F_{c1}$ may bring the dynamometer load to the road-equivalent load, I have found that it does not correct speed errors, particularly when the vehicle mass being simulated is a large multiple or small fraction of the equivalent mass of the dynamometer. For example, referring to FIGS. 2a and 2b, the solid lines 32a and 32b indicate the vehicle power and road speed respectively and the dotted lines 34a and 34b indicate the dynamometer power and speed respectively. For simulation of a 100,000 lb. vehicle on a 3000 lb. effective mass dynamometer, when the vehicle power is changed suddenly from 250 horsepower to zero horsepower, such as when changing gears, the change in the dynamometer power lags that of the vehicle but matches the change when changed by an amount equal to $F_{c1}$. However, a speed error of 2 mph occurs in the first 1/10th second measuring time interval after the change in vehicle power, and persists even after the dynamometer power has been corrected. I have found that both the load and the speed of the dynamometer can be brought to the road-equivalent values when the speed of the vehicle changes by adding to the dynamometer load a feed-forward value $F_c$ which is equal to $F_{c1}$ plus a speed adjustment factor $F_{c2}$, where the speed adjustment factor is determined by the following equation:

$$F_{c2} = M_o(V_m - V_r)/\Delta t$$

Figure 2A:
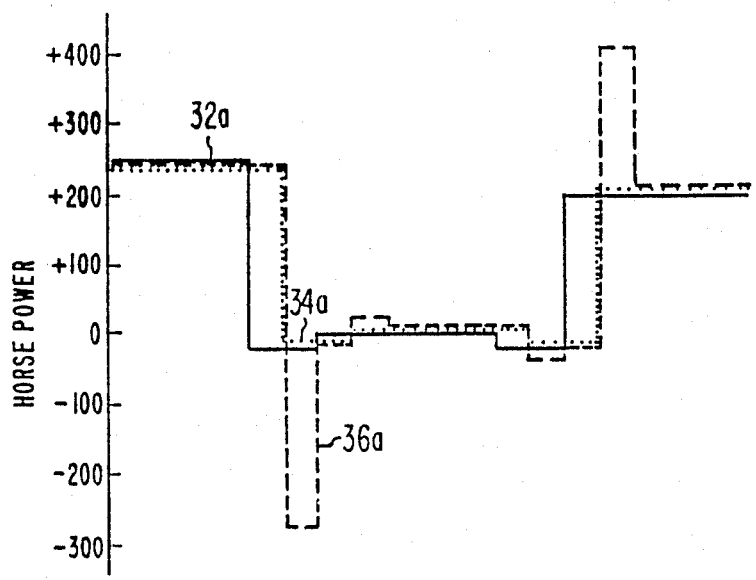
FIG. 2a is a graph of the changes in power of a vehicle and dynamometer during a typical operation of the vehicle.
Figure 2B:
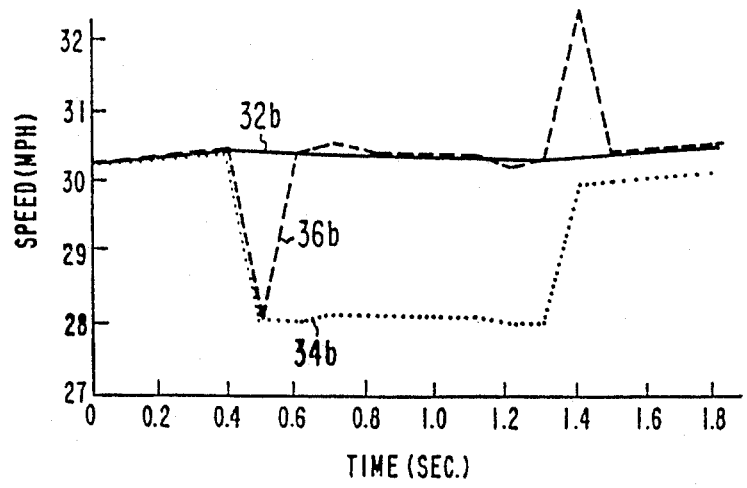

As shown by the dash lines 36a and 36b in FIGS. 2a and 2b respectively, if the dynamometer load is adjusted to an amount equal to $F_c$ which is $F_{c1}$ plus $F_{c2}$, both the dynamometer load and speed will be adjusted to the vehicle load and speed.

Therefore, to control a dynamometer so that it follows the changes in load and speed of a vehicle being tested on the dynamometer, in accordance with the method of the present invention, the following steps should be carried out:

1. Take high precision measurements of the dynamometer speed, $V_m$, and dynamometer load, $F_m$, over a short precise time interval, $\Delta t$, to obtain the average speed and load using the readings preceding and following each time interval.
2. Determine the road-equivalent speed change $\Delta V_r$ using the formula previously given.
3. Determine the feed-forward value $F_{c1}$ using the formula previously given.
4. Determine the speed change factor $F_{c2}$ by using the formula previously given.
5. Set the dynamometer load $F_m$ to a value equal to $F_c$ which is $F_{c1}$ plus $F_{c2}$
6. Repeat steps 1 through 5 at the end of each $\Delta t$.

In the operation of the dynamometer 10, since, as previously stated, all of the factors in the various equations except the measured dynamometer speed and load are either constants or fixed values, the load of the dynamometer can be controlled by a suitable microprocessor. The constant or fixed values are fed into the microprocessor and the output signals of the load measuring transducer 26 and the speed measuring transducer 19 are connected into the microprocessor. The output of the microprocessor is connected to means for controlling the power absorption and motoring unit so that when the microprocessor receives the changes in the measured load and speed after each interval of time, it will calculate the necessary load change, $F_c$, and adjust the load of the power absorption unit accordingly. Thus, there is provided by the present invention, a method of controlling a dynamometer which adjusts the dynamometer so that not only its load follows changes in load of the vehicle being tested but also the speed of the dynamometer quickly controls changes in the speed of the vehicle to match those which the vehicle would achieve if operated the same way on the road.

Figure 3:
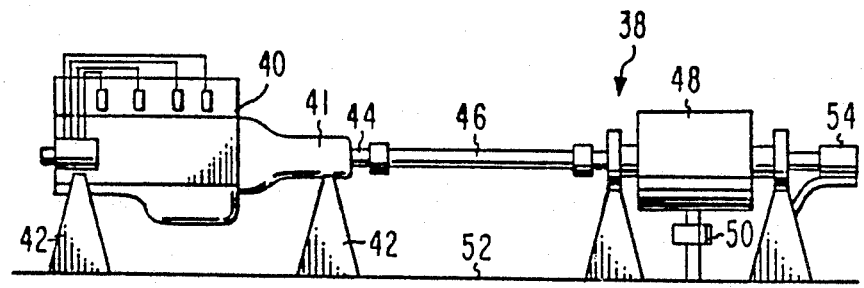
FIG. 3 is a schematic view of a vehicle powertrain connected directly to a dynamometer.

Although the method of the present invention has been described with regard to testing a vehicle on a chassis roll dynamometer, it can be used with other types of dynamometers, such as the dynamometer 38 shown in FIG. 3 which is connected directly to the powertrain of a vehicle. The vehicle engine 40 and transmission 41 are mounted on supports 42 and have their output shaft 44 connected by a shaft 46 to the power absorption and motoring unit 48 of the dynamometer 38. A torque transducer 50 is connected between the power absorption and motoring unit 48 and the base 52 on which the vehicle engine 40 and dynamometer 38 are supported. A speed transducer 54 is also connected to the power absorption and motoring unit 48. The dynamometer 38 can be controlled by the method of the present invention in the same manner as described above with regard to the chassis roll dynamometer 10.

I claim:

1. A method of controlling a dynamometer system for simulating road load forces and speed of a vehicle being tested in place which system includes means adapted for driving engagement with the powertrain of the vehicle, a power absorption and motoring unit coupled with the driving engagement means for simulating road load forces, a torque transducer for providing a signal corresponding to the equivalent force of the power absorption and motoring unit and a speed transducer for providing a signal corresponding to the speed of the power absorption and motoring unit, said method comprising the steps of:

(a) determining changes in the speed of the power absorption unit as a result of changes in speed of the vehicle;
   (b) determining the force to which the power absorption and motoring unit must be set to match the change in force of the vehicle which produces the change in speed;
   (c) determining the feed-forward force value to compensate for errors in the change of speed of the power absorption and motoring unit as a result of differences in the mass of the vehicle and the dynamometer; and
   (d) setting the power absorption and motoring unit at a force equal to the sum of the forces determined in steps (b) and (c).

2. A method in accordance with claim 1 in which steps (a) and (b) are taken over a short, precise time unit.

3. A method in accordance with claim 2 in which steps (a) through (d) are repeated over successive short, precise time units.

4. A method of controlling a dynamometer system for simulating road load forces and speed of a vehicle being tested in place which system includes means adapted for driving engagement with the powertrain of the vehicle, a power absorption and motoring unit coupled with the driving engagement means for simulating road load forces, a torque transducer for providing a signal corresponding to the equivalent force of the power absorption and motoring unit, and a speed transducer for providing a signal corresponding to the speed of the power absorption and motoring unit, said method comprising the steps of:

(a) determining the power absorption and motoring unit force ($F_m$) and speed ($V_m$) over a short, precise time unit ($\Delta t$) to obtain the average force using the readings preceding and following each time interval;
   (b) determining the road equivalent speed change ($\Delta V_r$) over $\Delta t$;
   (c) determining a first feed-forward force value ($F_{c1}$) to which the power absorption and motoring unit force must be set to match the change in the power absorption and motoring unit speed to $\Delta V_r$;
   (d) determining a second feed-forward force value ($F_{c2}$) to be added to $F_{c1}$ to compensate for errors between $V_m$ and $V_r$ as a result of differences in the mass of the vehicle and the dynamometer; and
   (e) setting the force of the dynamometer to the sum of $F_{c1}$ and $F_{c2}$.

5. A method in accordance with claim 4 in which steps (a) through (e) are repeated at the end of each $\Delta t$.

6. A method in accordance with claim 5 in which $F_{c2}$ is determined by the following:

$$F_{c2} = (V_m - V_r) M_o/\Delta t$$

where $M_o$ = effective mass of dynamometer outside of control loop.

7. A method in accordance with claim 6 in which $\Delta V_r$ is determined by the following:

$$\Delta V_r = \frac{\Delta t(F_{ma} - (A + B V_{ma} + C V_{ma}^2 + (\sin\theta + D)W)) + M_o \Delta V_m}{M}$$

where
$F_{ma}$ = the average $F_m$ using the readings preceding and following each time interval,
$V_{ma}$ = the average speed,
A = a constant rolling resistance parameter with dynamometer constant friction outside the control loop subtracted,
B = a constant which is the speed proportional rolling resistance parameter with dynamometer speed proportional friction outside the control loop subtracted,
C = a constant which is a wind resistance parameter with dynamometer speed squared friction outside the control loop substrate subtracted,
W = gross weight of vehicle,
$\sin\theta$ = sine of hill angle above or below horizontal,
D = constant parameter for braking and miscellaneous forces,
M = effective mass of vehicle.

8. A method in accordance with claim 7 in which $F_{c1}$ is determined by the following:

$$F_{c1} = A + BV_m + CV_m^2 + W(\sin\theta + D) + (M - M_o)(\Delta V_r/\Delta t).$$

* * * * *